United States Patent [19]

Godtschalck

[11] 4,120,551
[45] Oct. 17, 1978

[54] INTERLOCKING DRAWER ASSEMBLY

[75] Inventor: Lucien Joseph Godtschalck, Orsay, France

[73] Assignee: Krieg & Zivy Industries, Le Plessis-Robinson, France

[21] Appl. No.: 735,544

[22] Filed: Oct. 26, 1976

[30] Foreign Application Priority Data

Oct. 31, 1975 [FR] France ................ 75 33328

[51] Int. Cl.² ................................. A47B 88/00
[52] U.S. Cl. .......................... 312/330 R; 312/263; 312/111; 220/76
[58] Field of Search ............... 312/330, 263, 108, 111; 220/4 F, 76

[56] References Cited

U.S. PATENT DOCUMENTS

| 2,499,299 | 2/1950 | Curran | 312/330 |
|---|---|---|---|
| 3,282,635 | 11/1966 | Himelreich | 312/330 |
| 3,410,441 | 11/1968 | Rhyne | 312/263 |
| 3,462,208 | 8/1969 | Black et al. | 312/330 |
| 3,549,228 | 12/1970 | Aleks | 312/330 |
| 3,591,212 | 7/1971 | Rhyne | 220/76 |
| 3,687,512 | 8/1972 | Alston | 312/330 |
| 3,744,869 | 7/1973 | Anderson et al. | 312/330 |
| 3,901,572 | 8/1975 | Litchfield | 312/330 |

FOREIGN PATENT DOCUMENTS

| 2,323,308 | 11/1973 | Fed. Rep. of Germany | 312/263 |
|---|---|---|---|
| 685,274 | 7/1930 | France | 312/330 |
| 2,550 of | 1897 | United Kingdom | 312/263 |

*Primary Examiner*—Mervin Stein
*Assistant Examiner*—Victor N. Sakran
*Attorney, Agent, or Firm*—Charles E. Brown

[57] ABSTRACT

A kit of parts for assembly into a drawer comprises a bottom panel, two side panels, a back panel, and a front panel, and assembly means adapted to connect the panels in pairs. The assembly means comprise a male attaching part on one panel and a female attaching part adapted to receive the male attaching part on another panel, and the panels and the attaching parts are suitably moulded from synthetic plastics material.

3 Claims, 16 Drawing Figures

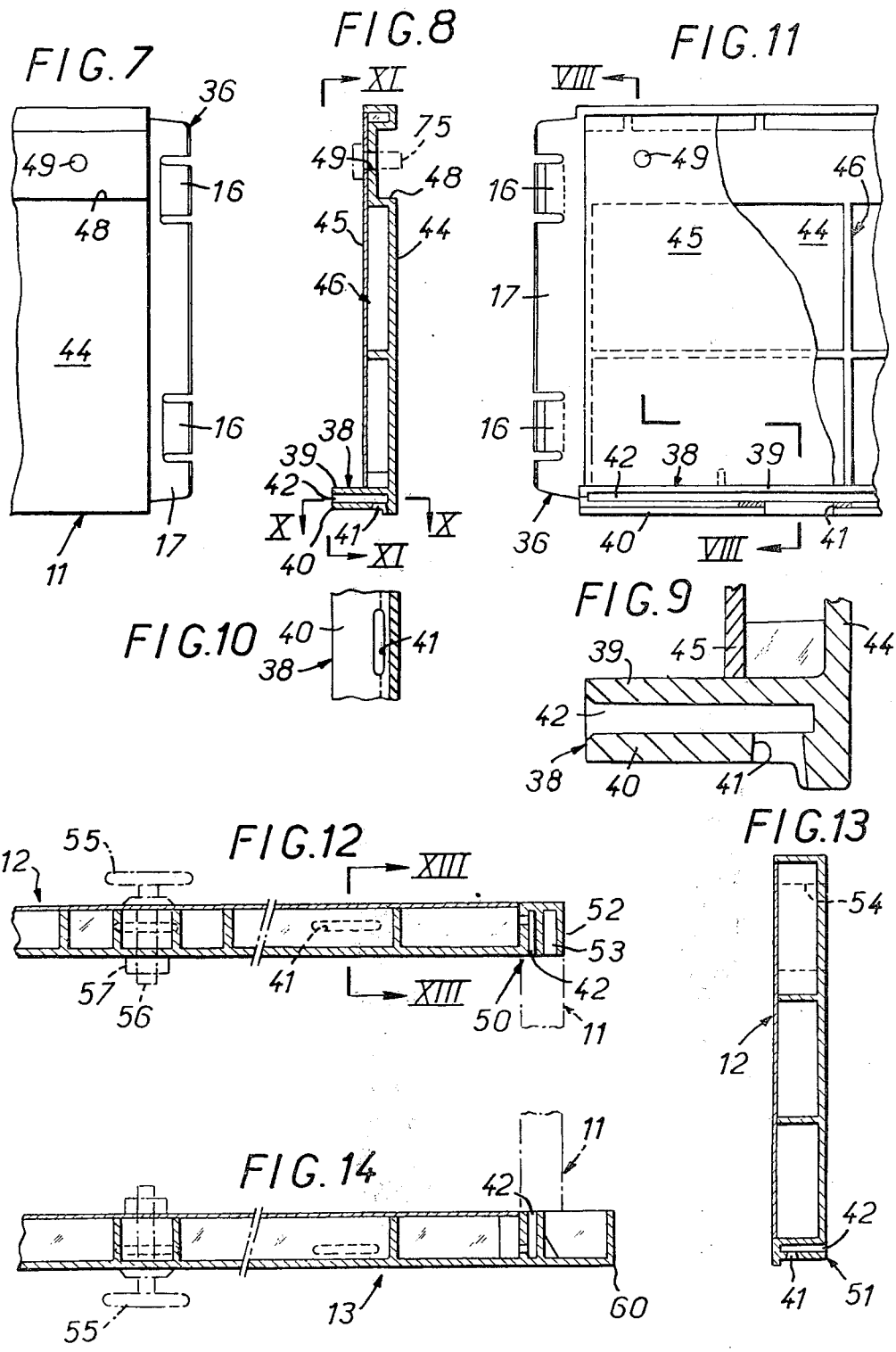

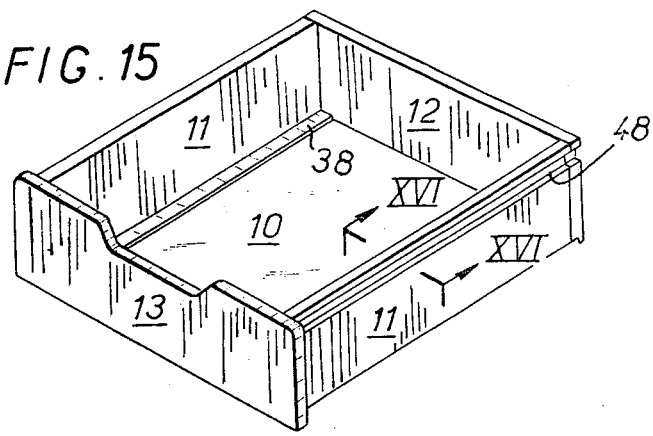
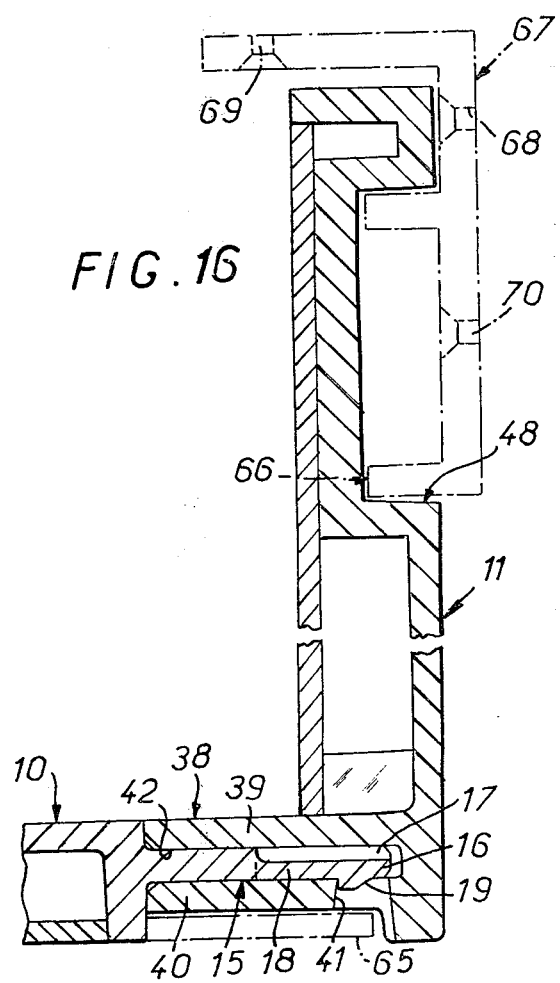

INTERLOCKING DRAWER ASSEMBLY

BACKGROUND OF THE INVENTION

The present invention relates generally to drawers and in particular to drawers which are intended to be part of the inside equipment of a wall cupboard, a wardrobe or any other storage enclosure of this kind.

In many cases these drawers are made to order, usually by a specialist tradesman, using wood panels cut to the required dimensions and assembled directly.

Because of the wide range of dimensions these drawers may have in practice, not only in height but also in width or depth, and the amount of space required to store individual ready-made drawers, direct "off-the-shelf" sales to the public offering a sufficiently wide range of ready assembled drawers to meet the great variety of requirements would quickly result in prohibitively large stocks.

For this reason it has already been proposed to offer directly to the public drawers of this type in the form of separate panels which can be assembled together, assembly means adapted to join said panels together in pairs being provided so that the fitting together can be carried out.

When reduced to separate, unassembled panels of this type, the components of a drawer occupy an advantageously small amount of space, which also facilitates transport to the sales outlet, as well as storage.

However, in the drawer kits which are known at present, the means of assembly provided for connecting the panels in pairs are conventional assembly means, such as a relatively large number of screws and/or nails.

Consequently it requires a relatively long time to assemble such a drawer, and the specialist salesmen concerned are unable to carry out the operation and see that it is properly performed.

Thus the final quality of the assembly depends to a certain extent on the skill of the person performing the work and, for the reasons explained above, this will in practice be the purchaser concerned.

However, if the assembly has not been well done, the finished drawer will not be of the specified overall dimensions and, apart from this aspect alone, it may not run satisfactorily on the guideways usually associated with it.

The object of the present invention is to provide a drawer which is free from these disadvantages.

SUMMARY

A fit-together drawer according to the invention comprises a bottom panel, two side panels, a front panel and a back panel, said panels forming separate elements, and assembly means adapted to join said panels in pairs and comprising, for one panel, a male engaging part and, for another panel, a female engaging part adapted to receive said male part.

Thus, since the assembly of the fit-together drawer according to the invention is carried out essentially by snapping the elements together, it is very quick and can be carried out at the point of sale and therefore can be strictly supervised.

BRIEF DESCRIPTION OF THE DRAWINGS

FIG. 7 is a partial elevation view of a side panel of the fit-together drawer according to the invention, in the direction of the arrow VII of FIG. 1 and FIG. 8;

FIG. 8 is a view in cross-section of a side panel along the broken line VIII—VIII of FIG. 11;

FIG. 9 shows a detail of FIG. 8 on a larger scale;

FIG. 10 is a partial sectional view of a side panel along the line X—X of FIG. 8;

FIG. 11 is a partial elevation of this side panel in the direction of the arrow XI of FIG. 8, partly broken away and in local section;

FIG. 12 is a partial view in longitudinal section of the back panel of the fit-together drawer according to the invention, taken along the line XII—XII of FIG. 1;

FIG. 13 is a view in transverse section of this back panel along the line XIII—XIII of FIG. 12;

FIG. 14 is a partial view in longitudinal section of the front panel of the fit-together drawer according to the invention, taken along the line XIV—XIV of FIG. 1;

FIG. 15 is a perspective view of the fit-together drawer according to the invention when its component parts have been assembled; and FIG. 16 is a view in cross-section along the line XVI—XVI of FIG. 15 illustrating especially the clipping-together assembly employed in the fit-together drawer according to the invention.

DESCRIPTION OF THE PREFERRED EMBODIMENT

Figure 1:
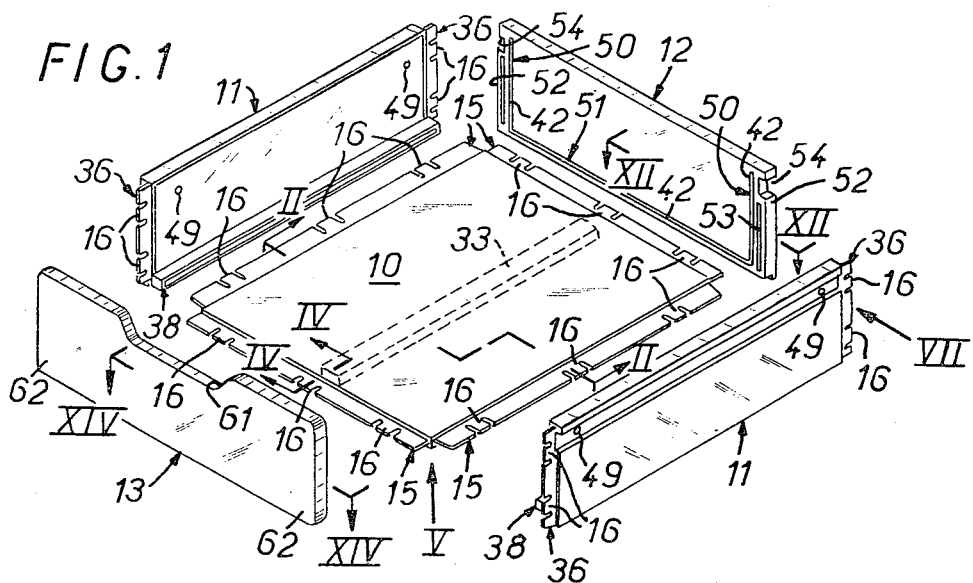
FIG. 1 is an exploded perspective view of a fit-together drawer according to the invention.

The Figures illustrate by way of example the application of the invention to the construction of a kit of parts which can be assembled into a finished drawer, each of the constituent panels of which can be produced entirely from synthetic material, for example polystyrene, by appropriate moulding.

This fit-together drawer comprises a bottom panel 10, two similar side panels 11, a back panel 12, and a front panel 13, said panels forming distinct elements, separate from one another.

Moreover, in the manner known per se, assembly means are provided, adapted to join these panels together in pairs.

In accordance with the invention, the assembly means are integral with the panels and comprise, for one panel, a male part for engagement by snapping together and, for another panel, a female engaging part adapted to receive the male part.

In the example shown the bottom panel 10 has a male part on each of its four sides; a male part of this kind has been given the general reference 15 in the Figures.

In the example shown, the male part 15 comprises at least one elastically deformable detent hook 16 which extends as a projection along the edge of the bottom panel 10 parallel to the general plane of the panel.

In practice, in the example shown, for each side of the bottom panel 10 there are three detent hooks 16 and each of these constitutes a local break in an interlocking tongue or lamina 17 which projects from the edge forming the side of the panel, all along said side and parallel to the general plane of this panel.

To give greater elasticity, each detent hook 16 has an arm 18, the thickness of which is reduced by comparison with that of the interlocking lamina 17 in which it forms a local break, the arm 18 carrying at the end the detent tip of this hook.

Figure 3:
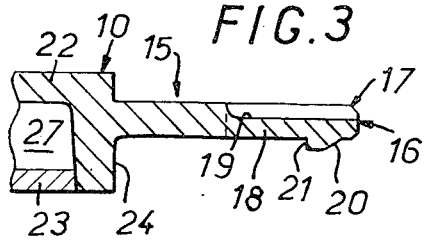
FIG. 3 shows a detail of FIG. 2 on a larger scale.
Figure 5:
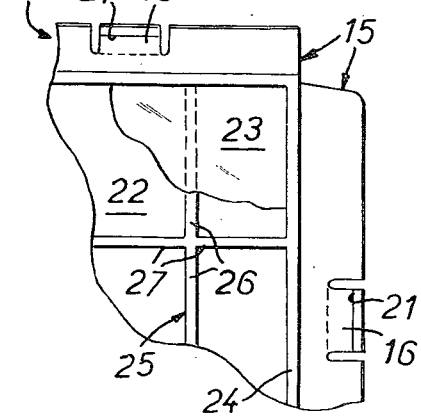
FIG. 5 is a partial view from below of the bottom panel according to the invention, in the direction of the arrow V of FIG. 1, partly broken away.

As can be seen better from FIG. 3, one of the principal faces 19 of one of these detent hooks 16, namely the one which is recessed relative to the corresponding face of the interlocking lamina 17 in which this hook forms a local break, is globally plane whereas the other one of the principal faces of the hook has, beyond a plane of engagement to which is oblique, a transverse retaining shoulder 21, the whole constituting the detent tip of said hook.

In the example shown which, as mentioned above, relates to a construction made preferably from synthetic plastics material, the bottom panel 10 has an overall internal structure in the form of a cellular box, this bottom panel having, between an upper wall 22 and a lower wall 23, (which are bounded on the periphery by a rim 24 which connects one to the other in the transverse direction and which forms the edge of said panel), a network 25 of cross-braced ribs 26, 27.

In practice, in the example shown, the rim 24 and the network of ribs 25 are integral with the upper wall 22, the whole having been produced by a continuous moulding process; the lower edges of the ribs 26, 27 constituting the network 25 being recessed relative to the corresponding lower edge of the rim 24 by an amount corresponding to the thickness of the associated lower surface wall 23, so that the latter can be fitted into the space delimited by said rim, until contact is made with the ribs; in this way it can be joined to the ribs and to the rim, for example by ultrasonic welding.

Figure 6:
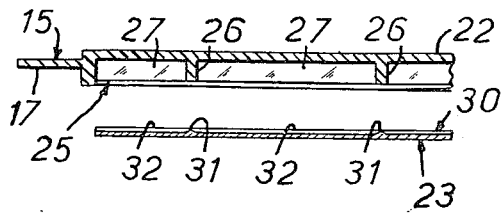
FIG. 6 is a view in partial section of one of these bottom panels illustrating the assembly of the two component parts.

Preferably, in accordance with an arrangement shown in FIG. 6, the lower wall 23 has projecting from it at a level with the network 25 of ribs 26, 27 integral with the upper wall 22, a network 30 of cross-braced ridges 31, 32 of a slight thickness adapted to strengthen, by crushing during welding of the assembly, the joining of the lower wall 23 to the network 25 of ribs 26, 27.

Figure 2:
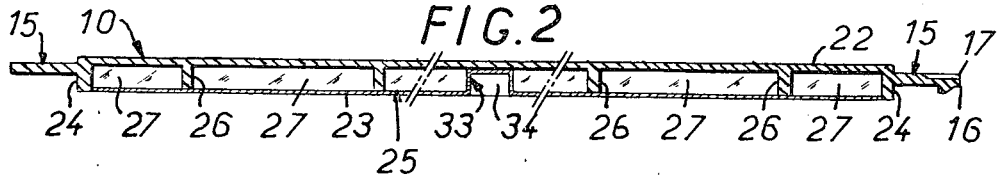
FIG. 2 is a sectional view of the bottom panel of this drawer, taken along the broken line II—II of FIG. 1.
Figure 4:
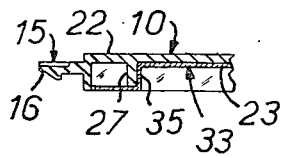
FIG. 4 is another view in partial section of this bottom panel along the line IV—IV of FIG. 1.

Preferably, and as illustrated in FIGS. 2 and 4, the bottom panel 10 has on its lower face a groove 33 which extends as a continuation between two end transverse facets 34, 35, from a zone close to its front side to a zone close to its rear side, transversely relative to said sides.

The end transverse facets 34, 35 of this groove 33 are able to co-operate with a stop provided for this purpose on the frame or stand in which the drawer slides, in order to limit the sliding distance of the drawer in its frame (not shown in the Figures).

In the example shown the groove 33 results from a corresponding disconnection of the lower wall 23 of the bottom panel 10 which comes to rest against the upper wall 22 associated with this bottom panel by means of elimination locally of the ribs 27 in the median zone of this bottom panel.

The side panels associated with the bottom panel 10 described above are interchangeable with one another and each has, on each of its transverse sides, at the front and the back, a male engaging part 36.

This male engaging part 36 has a plurality of the detent hooks 16, two in the example shown, each forming a local break in a tongue or lamina 17, and since it is in all points similar to the male engaging part 15 described above for the bottom panel 10, it will not be explained in further detail here.

For assembly with the bottom panel 10, each side panel 11 also has, on its lower longitudinal side, a female engaging part 38 complementary to the corresponding male engaging part 15 of the bottom panel.

This female engaging part 38 comprises two lips 39, 40 of which one, namely the lower lip 40, has at certain points corresponding with the detent hooks 16 of the corresponding male engaging part 15 on the bottom panel 10, detent means in the form of slots adapted in each case to receive the detent tip of such a hook, as shown in FIGS. 8, 9 and 10.

In practice, and as shown, the lips 39, 40 forming the female engaging part 38 on a side panel 11 project substantially perpendicularly from the general plane of such a panel and jointly form an interlocking groove 42 which runs right along the respective lower side of this panel and which is adapted to receive the tongue or interlocking lamina 17 of the corresponding male engaging part 15 of the bottom panel 10.

Like the bottom panel 10, a side panel 11 has an internal structure in the form of a cellular box, having between an outer wall 44 and an inner wall 45, a network 46 of cross-braced ribs which is integral with the outer wall 44 in the example shown, the rim joining this outer wall 44 to the inner wall 45 associated therewith likewise being integral with the outer wall 44.

Since this cellular structure is in general similar to that described previously for the bottom panel 11, it will not be explained in greater detail here.

All that will be specified is that each outer wall 44 forms a groove 48 which runs over the entire length of a side panel 11, from its front transverse side to its rear transverse side, for possible co-operation with a guideway provided for this purpose in the frame or stand in which the drawer is to be slidably mounted.

Close to each end, this groove 48 has a passage 49 running transversely right through the side panel to allow the fitting if necessary of a stop to limit the sliding travel of the drawer; a stop 75 of this kind is shown schematically by broken lines in FIG. 8.

The back panel 12 has a female engaging part on each of its lateral transverse sides for assembly to the side panels 11 and a female attaching part 51 on its lower longitudinal side for assembly to the bottom panel 10, FIGS. 1, 12 and 13.

These female attaching parts 50 and 51 are in all respects similar to the female attaching part 38 described above with reference to the side panels 11 and they will not be described in detail here.

It is only necessary to specify that each has an interlocking groove 42 of which one lip has at certain points slots or recesses 41 adapted to receive the detent tip of an engaging hook 16.

The whole assembly of interlocking grooves 42 thus present on the back panel 12 runs as a whole in the form of a U close to the periphery of this back panel.

Beyond each of the interlocking grooves 42 thus associated with its lateral transverse sides, the back panel 12 has an extension 52 adapted to allow it to become flush at the end with the outer wall of the side panel 11 corresponding to it, as shown schematically by broken lines in FIG. 12.

Preferably, and as shown, this extension 52 is formed with a groove 53 of which the concavity is turned towards the same side as the inner wall of the back panel 12, so that this groove 53 is concealed by the corresponding side panel 11 when the latter is in position.

Each lateral extension 52 of the back panel 12 also carries a cut-out 54, FIGS. 1 and 13, disposed so as to be level with the groove 48 in the corresponding side panel 11, in the extension of this groove.

Like the bottom panel 10 and the side panels 11, the back panel 12 preferably has an internal structure in the form of a cellular box which is of the same type as that previously described and will not therefore be explained in detail here.

All that needs to be specified is that, preferably, this structure is strengthened in the central zone of the back panel 12 by an increase in this zone in the number of ribs forming this structure, as shown in FIG. 12, so as to allow the back panel 12 to be utilised as a front panel by the fixing of some kind of handle in the central zone.

One such handle may be, for example, a knob 55 as shown schematically by broken lines in FIG. 12, said knob being carried by a threaded rod 56 which passes right through the panel 12, after a hole has been drilled in the latter, to co-operate with a locking-nut 57.

The front panel 13 is of a similar structure to the back panel 12, having in particular a female attaching part with an interlocking groove 42 on each of its lateral transverse sides, for assembly with the side panels 11, and a similar female clipping part with an interlocking groove on its lower longitudinal side, for assembly with the bottom panel 10 (not visible in the Figures).

The front panel 13 will therefore not be described in detail here.

It should be specified, however, that in the example of construction shown, on the one hand the lateral extensions 60 on this front panel 13 extend further than the similar lateral extensions 52 on the back panel 12, for support on the corresponding edges of the frame or stand in which the drawer according to the invention is intended to be slidably fitted and that, on the other hand, its upper longitudinal side has a cut away portion 61 to act as a means for pulling open the drawer, as shown in FIG. 1.

Preferably, however, its central zone is strengthened, like that of the back panel 12, for the insertion if necessary of a knob 56, as shown by the broken line in FIG. 14.

As can be readily imagined, fitting together of the drawer according to the invention is carried out very quickly by the engagement, with their female clipping parts 38 with the interlocking groove 42 of the side panels 11 on to the male attaching parts 15 present on the bottom panel 10 on its corresponding opposite sides, this engagement being continued until the detent tips of the hooks 16 of the male attaching parts 15 in question come into engagement with the slots or recesses 41 provided for this purpose on the female attaching parts, as shown in FIG. 16; then by a corresponding engagement of the back panel 12, on the one hand with the bottom panel 10 and, on the other, with the side panels 11; and finally by analogous engagement of the front panel 13, on the one part with the bottom panel 10 and, on the other with the side panels 11.

As can also be readily understood, when it is engaged in an interlocking groove 42, each detent hook 16 is deformed elastically by its oblique engagement surface 19 resting against the lip 40 of the groove in question, the elastic deformation being made possible by the fact that the arm 18 of this detent hook 16 is not as thick as the tongue or interlocking lamina 17 in which it forms a local break; in fact this smaller thickness enables the detent hook 16 to bend elastically in the direction of the lip 39 of the interlocking groove 42 in which it is engaged.

As soon as the retaining shoulder 21 on the detent hook 16 comes opposite the recess 41 in the corresponding female part, this detent hook returns elastically to its initial shape and its detent tip engages in the recess.

In a variant construction shown by the broken line in FIG. 16 in the lower portion of the Figure, there is associated with a detent hook 16 a guiding lip 65 located at a distance from the hook, parallel to the latter and projecting over the corresponding edge of the bottom panel carrying this hook.

In a case such as this, the interlocking lamina or tongue 17 of such a panel forms, with the associated guiding lip 65, an interlocking groove.

As shown by the broken line in FIG. 16 in the upper portion of the Figure, the drawer according to the invention may be mounted so as to slide on guides 66 adapted to co-operate, each one respectively, with the grooves 48 on the outer face of the side panels 11.

As can be seen from FIG. 16, such a guide 66 may be carried by a corner plate 67 by which it can be fixed either horizontally with drilled holes 68, or vertically with drilled holes 69.

These guides 66 may, however, equally well be fixed directly horizontally with drilled holes 70.

As will have been appreciated, construction in moulded synthetic material as described above produces, through its cellular structure, panels with excellent rigidity and closely controlled dimensions, which removes all assembly difficulties and prevents any faulty running of the resultant drawer.

It is obvious, however, that the constituent panels of the fit-together drawer according to the invention need not necessarily consist of synthetic material and/or that they must necessarily have an internal structure in the form of a cellular box.

For example, in a variant construction which is not shown, these panels might be of wood and the means of assembly by which the panels are snapped together as provided by the invention consist of inserts suitably fixed to the panels.

Again, as will be appreciated, the same front and back panel may be used equally well to form drawers of different depths; the only variant in this case would be the bottom panel and the corresponding side panels.

Similarly, one and the same bottom panel may be used equally well for drawers of different heights; in this embodiment the only variant would be the side panels and the front and back panels.

It is also possible for the same side panels to be used equally well for drawers of different widths, the only variant in this case being the bottom panel and the front and back panels.

Furthermore it is also possible to associate with bottom panels, side panels and back panels of the same colour, front panels of a different colour adapted to that of the frame or stand in which the drawer has to be fitted.

The different colour of the front panel may be due to the suitable colouring of the actual mass of material of which it consists or it may simply be the result of the application of an appropriate decoration or veneer to the panel.

Furthermore, the grooves which are formed in the outer face of the side panels may be replaced by rings in relief, for co-operation with a complementary groove which is integral with the frame or stand in which the drawer slides.

The invention is not limited to the form of construction which has been described and illustrated but embraces all variants of execution within the scope of the appended claims. In particular it is not necessary for the female attaching parts to have recesses for the engagement of the detent tips of the corresponding engaging hooks. It would be sufficient for them to have slots adapted to this type of engagement.

Moreover, and as will have been noted in the example, the slots in which the detent tips of the engaging hooks engage open out, at least in the case of the snapping together of the side panels and the front and back panels, into blind spaces in the latter; the same applies to the snapping together of the bottom panel and the other panels when the bottom panel has guiding lips 65. As a result, dismantling of the drawer according to the invention is normally impossible, which helps to preserve the qualities of construction, and in particular maintains strict precision of the drawer sides.

I claim:

1. A readily mountable drawer comprising a bottom panel, two side panels, a front panel and a back panel, pairs of complementary positive detent means integrally formed in one piece with respective juxtaposed panels for hand assembling said drawer by substantially exclusively unidirectional relative displacement of said juxtaposed panels until they are locked in place relative to one another, each of said panels being connected to an adjacent one of said panels by an interlocking connection including an elongated male strip generally lying in a plane and a similarly elongated female part defining an elongated groove, and said detent means including each male strip being at least partially discontinuous in a transverse direction to define a pair of independent hooks, each hook lying generally coplanar with the remainder of said male strip and having a free portion lying along a free edge of said male strip, and each hook free portion having on one surface thereof a transverse detent projecting normal to said plane, said female part having a notch opening from the interior of said groove and receiving each detent, and the opposite surface of each hook free portion having a relieved part extending transversely away from said free edge beyond said detent to permit flexing of said hook free portion relative to the remainder of said hook and passage of said hook free portion into said groove together with entry of said detent into said notch.

2. A drawer according to claim 1, wherein at least one of said panels has a guiding lip fixed thereto adjacent its male strip and extending in spaced from and parallel relation to the respective male strip to sandwich a portion of a corresponding one of said female attaching parts between said guiding lip and its associated male strip.

3. A drawer according to claim 1, wherein said pairs of detent means are provided between said bottom panel and the other of said panels as well as between the side panels and the front and back panels.

* * * * *